(12) United States Patent
Briand (10) Patent No.: US 9,625,568 B2
(45) Date of Patent: Apr. 18, 2017

(54) WIDEBAND DIGITAL RECEIVER COMPRISING A PHASE JUMP DETECTION MECHANISM

(75) Inventor: Thierry Briand, Croissy sur Seine (FR)

(73) Assignee: THALES, Courbevoie (FR)

(*) Notice: Subject to any disclaimer, the term of this patent is extended or adjusted under 35 U.S.C. 154(b) by 0 days.

(21) Appl. No.: 13/139,252

(22) PCT Filed: Dec. 14, 2009

(86) PCT No.: PCT/EP2009/067130
§ 371 (c)(1),
(2), (4) Date: Aug. 11, 2011

(87) PCT Pub. No.: WO2010/069938
PCT Pub. Date: Jun. 24, 2010

(65) Prior Publication Data
US 2011/0286552 A1 Nov. 24, 2011

(30) Foreign Application Priority Data
Dec. 16, 2008 (FR) .................................. 08 07068

(51) Int. Cl.
*H03K 9/00* (2006.01)
*G06E 1/00* (2006.01)
(Continued)

(52) U.S. Cl.
CPC .......... *G01S 7/021* (2013.01); *H04W 72/0446* (2013.01)

(58) Field of Classification Search
CPC .. G01S 3/043; G01S 2007/2883; G01S 7/285; G01S 7/352; G01S 13/56; G01S 19/21; G01S 7/4021
(Continued)

(56) References Cited

U.S. PATENT DOCUMENTS 4,194,204 A * 3/1980 Alpers .................... G01S 13/24
342/109
4,336,541 A 6/1982 Tsui et al.
(Continued)

FOREIGN PATENT DOCUMENTS

FR 2695730 A1 3/1994
WO 2007/090730 A1 8/2007

OTHER PUBLICATIONS

Adam Konrad Rutkowski ED—Vainikainen P et al.: "Measurement of microwave signals intrapulse parameters by means of IFM methods", Microwaves, Radar and Wireless Communications, 2008. Mikon 2008. 17th International Conference on, IEEE, Piscataway, NJ, USA, May 19, 2008, pp. 1-4, XP031324668.
(Continued)

*Primary Examiner* — Daniel Washburn
*Assistant Examiner* — Sarah Hassan
(74) *Attorney, Agent, or Firm* — Baker & Hostetler LLP (57) ABSTRACT

A wideband digital receiver includes an antenna, an amplifier, and a digital IFM device for measuring the frequency of the received signal or signals based on the result of discrete Fourier transforms DFT applied to said received signals. The receiver includes means for periodically estimating the phase jumps of said signals by combining the measurements of the phase of said signals produced by the transforms DFT.

10 Claims, 4 Drawing Sheets

(51) Int. Cl.
*G01S 7/02* (2006.01)
*H04W 72/04* (2009.01)

(58) Field of Classification Search
USPC .......................................................... 375/316
See application file for complete search history.

(56) References Cited

U.S. PATENT DOCUMENTS

| | | | |
|---|---|---|---|
| 4,547,727 A | 10/1985 | Tsui et al. | |
| 4,827,490 A * | 5/1989 | Guerin ........................... | 375/362 |
| 4,860,318 A | 8/1989 | Shaw et al. | |
| 5,477,230 A * | 12/1995 | Tsui ............................... | 342/442 |
| 6,014,551 A * | 1/2000 | Pesola et al. ................... | 455/86 |
| 6,512,064 B2 * | 1/2003 | Higuchi ...................... | C08J 5/18 |
| | | | 264/288.4 |
| 7,206,707 B1 * | 4/2007 | Tsui ........................ | G01R 23/12 |
| | | | 342/13 |
| 7,266,465 B1 * | 9/2007 | Tsui ........................ | G01R 23/12 |
| | | | 342/196 |
| 2005/0256652 A1 * | 11/2005 | Li et al. .......................... | 702/20 |
| 2005/0256657 A1 * | 11/2005 | Huggett ................ | G01R 23/165 |
| | | | 702/67 |
| 2006/0154611 A1 * | 7/2006 | Newton et al. ............ | 455/67.16 |
| 2007/0291625 A1 * | 12/2007 | Hendriks ............... | B82Y 10/00 |
| | | | 369/275.2 |
| 2008/0095132 A1 * | 4/2008 | Lindoff ................ | H04B 7/0817 |
| | | | 370/342 |
| 2010/0069030 A1 * | 3/2010 | Briand et al. ................. | 455/205 |
| 2011/0286551 A1 | 11/2011 | Briand et al. | |
| 2011/0286552 A1 * | 11/2011 | Briand .................... | G01S 7/021 |
| | | | 375/316 |

OTHER PUBLICATIONS

Adam Konrad Rutkowski et al., "Identification of Frequencies and Amplitudes of Microwave Simultaneous Signals by Means of IFM Methods," Microwaves, Radar and Wireless Communications, 2008, Mikon 2008, 17th International Conference on, IEEE, Piscataway, NJ, USA, May 19, 2008, pp. 1-4, XP031324644.

* cited by examiner

WIDEBAND DIGITAL RECEIVER COMPRISING A PHASE JUMP DETECTION MECHANISM

CROSS-REFERENCE TO RELATED APPLICATIONS

This application is a National Stage of International patent application PCT/EP2009/067130, filed on Dec. 14, 2009, which claims priority to foreign French patent application No. FR 08 07068, filed on Dec. 16, 2008, the disclosures of which are incorporated by reference in their entirety.

FIELD OF THE INVENTION

The invention relates to a wideband digital receiver comprising a phase jump detection mechanism.

BACKGROUND OF THE INVENTION

The receivers intended for the detection of radiofrequency signals, for example of radar type, must be capable of monitoring wide frequency bands notably in the microwave range. They must be able to detect, for example, radar signal pulses. These pulses may exhibit "chirp" or phase code type modulations, these modulations being used by the radar to compress the pulse on reception. The pulses may also be unmodulated, except by the all or nothing modulation defining the pulse. Among other things, the function of these receivers is to characterize the intercepted pulses by estimating parameters such as the time of arrival, the pulse width, the center frequency, the presence of modulation within the pulse and, where appropriate, the modulation type.

Although digital processing operations are usually included in the architecture of these receivers, the current solutions for estimating the frequencies of the received signals, hereinafter in the description designated by the acronym IFM (Instantaneous Frequency Measurement), are mostly based on analogue techniques.

As an example, one existing solution allowing for an instantaneous measurement of the frequency of the received signal is based on the creation of a regime of standing waves in a propagation line attacked at one of its ends by the signal and at the other by the delayed signal. The periodicity of the nodes and of the antinodes gives a rough measurement of the frequency of the received signal. The measurement of the position of the nodes and of the antinodes distributed along this line gives a fine measurement of the frequency of the received signal. This type of IFM is called frequency meter with spatial sampling.

Another solution of the state of the art, which is very widely used, is based on self-correlators or phase meters. The principle in this case is to directly measure the phase difference $\phi$ induced by a delay line and deduce the frequency therefrom. A number of stages, placed in parallel, are generally needed to provide the desired frequency band and accuracy.

The receivers implementing these solutions use analogue functions and are therefore subject to drifts such as delay variations as a function of temperature, level or phase shift measurement imperfections. This leads to a bulky and very costly architecture.

More recently, a French patent application relating to a frequency measurement wideband digital receiver filed under the number 06/01205 describes, unlike the previous two examples, a way of digitizing the signal on input, and of performing all the processing operations digitally. The digitization is performed at a sampling frequency well below the Shannon criterion. This is reflected in an ambiguous frequency measurement $F_{measurement}$, also called fine frequency hereinafter in the description, said frequency being able to be described by the following expression:

$$F_{measurement} = \pm(F_{real} - j \times F_e) + \delta F \quad (1)$$

in which $F_{real}$ is the real frequency of the received signal, j a positive integer, $F_e$ the sampling frequency of the system and $\delta F$ is the measurement error due mainly to the signal-to-noise ratio.

To resolve this ambiguity, N measurement channels are used in parallel, with offset sampling frequencies. The N ambiguous frequency measurements are associated to resolve said ambiguity and obtain a measurement of the real frequency of the incident signal. This measurement is called final frequency hereinafter in the description.

The detection of phase jumps is currently absent from most of the wideband IFM receivers used for the detection of signals such as radar pulses. This means that it is difficult to fully characterize a received signal pulse and phase codes, for example, cannot be detected.

SUMMARY OF THE INVENTION

One aim of the invention is notably to minimize the above-mentioned drawbacks.

To this end, the subject of the invention is a wideband digital receiver comprising at least an antenna, an amplifier, a digital IFM device for measuring the frequency of the received signal or signals based on the result of discrete Fourier transforms DFT applied to said received signals. Said receiver comprises means for periodically estimating the phase jumps of said signals by combining the measurements of the phase of said signals produced by the transforms DFT.

Four phase measurements $\phi_{n+a}, \phi_{n+b}, \phi_{n+c}, \phi_{n+d}$ corresponding to the respective results of four DFTs applied at instants referenced in time by the indices n+a, n+b, n+c and n+d can be combined in order to detect and estimate a phase jump value $\Delta\phi_n$ associated with a measurement period.

According to one aspect of the invention, the phase jump estimation $\Delta\phi_n$ over a measurement period is determined by calculating the difference between the intermediate deviations $\Delta\phi_{n,1} = (\phi_{n+b} - \phi_{n+a})$ and $\Delta\phi_{n,2} = (\phi_{n+d} - \phi_{n+c})$ by using the expression: $\Delta\phi_n = \Delta\phi_{n,2} - \Delta\phi_{n,1}$.

The indices of the four phase measurements $\phi_{n+a}, \phi_{n+b}, \phi_{n+c}, \phi_{n+d}$ are, for example, chosen such that (b−a)=(d−c).

In one embodiment, a phase jump is detected, for example, by the identification of a pattern of two consecutive phase measurement spikes, the spacing of which is linked to the choice of the indices a, b, c and d.

According to another aspect of the invention, the indices of the four phase measurements $\phi_{n+a}, \phi_{n+b}, \phi_{n+c}$ and $\phi_{n+d}$ can be chosen such that b=−c and a=−d.

In one implementation, the digital IFM device comprises N branches, the function of each branch being to measure the frequency and the phase of the received signal or signals after digitization, said digitization being performed with a sampling frequency specific to each branch, the phase measurements produced being used to estimate for each branch a phase jump value $\Delta\phi_n$.

An average of at least K phase jump estimations can be calculated in each measurement period, K being less than or equal to the total number of branches N.

The phase jump measurements estimated in each measurement period are, for example, classified by categories.

According to another embodiment, two measurement categories are defined, the first being associated with a phase jump of ±π and the second with a phase jump of ±π/2.

The signals of interest are, for example, radar pulses.

BRIEF DESCRIPTION OF THE DRAWINGS

Other features and advantages of the invention will become apparent from the following description given as an illustrative and nonlimiting example, based on the appended drawings in which.

DETAILED DESCRIPTION

Figure 1:
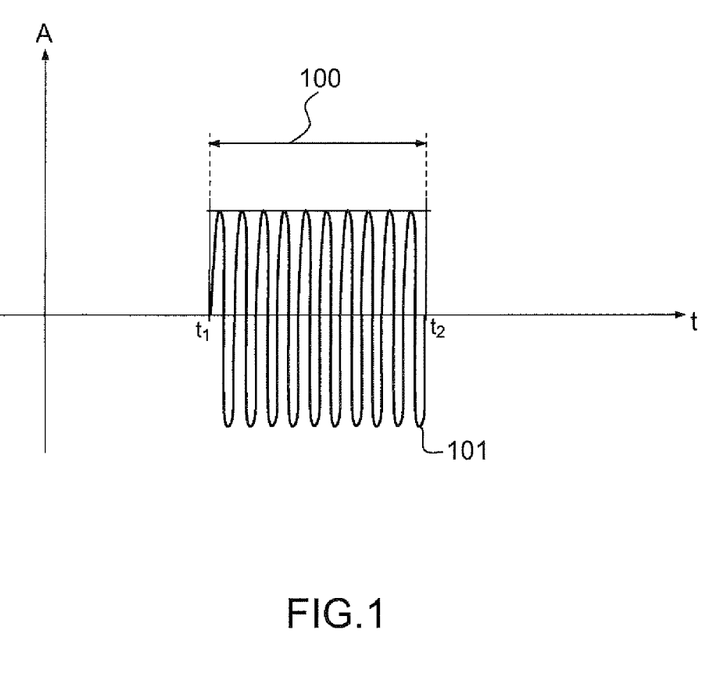
FIG. 1 gives an example of a signal pulse and its characteristics.

The purpose of the wideband receiver according to the invention is notably to detect and characterize microwave signal pulses. FIG. 1 gives an example of a signal pulse 100 and its characteristics. In this example, the pulse corresponds to a pure sinusoid, in other words an unmodulated signal, received at the time $t_1$ and ending at the time $t_2$.

The parameters to be detected associated with the pulse are notably the time of arrival of the pulse, usually designated by the acronym TOA, the pulse width designated by the acronym LI and the center frequency of the signal forming said pulse.

The pulse may also be characterized, when it is modulated, by frequency and phase modulation parameters. It may thus be advantageous to detect any phase jumps in a signal pulse, and that is what the present invention proposes to do.

Figure 2:
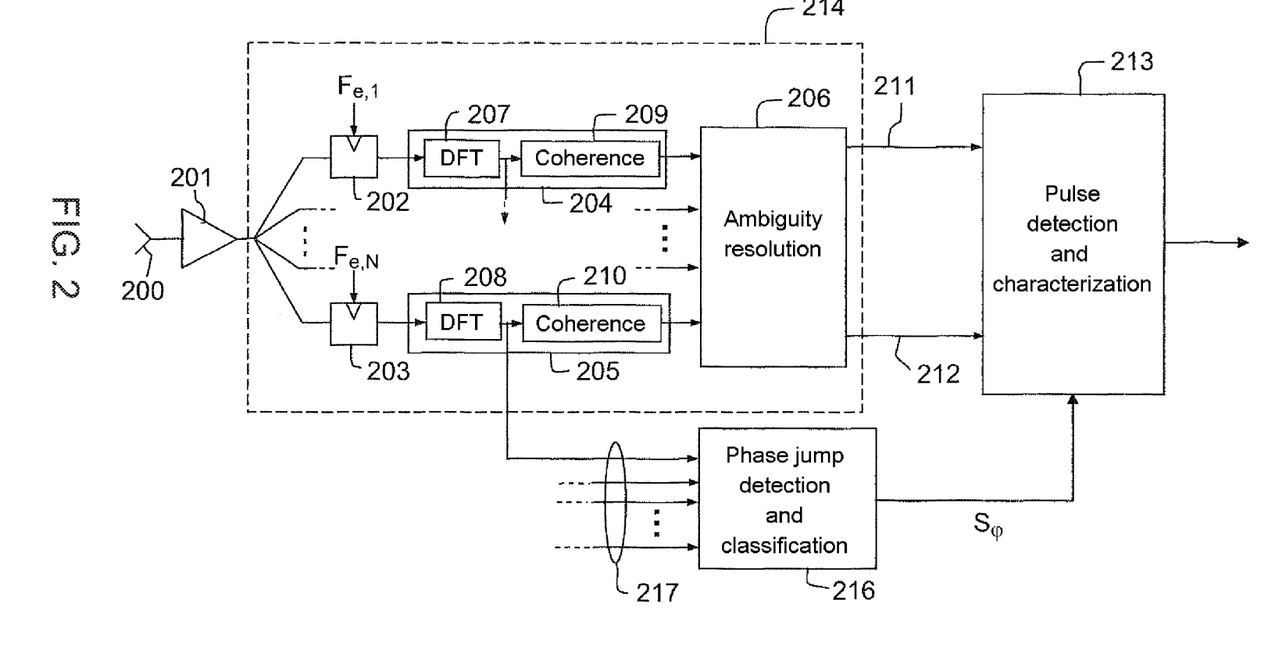
FIG. 2 shows an example of a wideband digital receiver comprising a phase jump detection mechanism.

FIG. 2 shows an example of a wideband digital receiver according to the invention comprising receiving radiofrequency circuits 200, 201, a frequency measurement device IFM 214, a phase jump detection device 216 and a device for detecting and characterizing the pulses 213. The receiver comprises at least a receiving antenna 200. The signal or signals received by said antenna are amplified 201 then distributed over N digital processing channels. On each channel, the signal can be, for example, digitized on 1 bit by a flip-flop 202, 203, the passband of which covers the range of the band to be processed. The N sampling frequencies denoted from $F_{e,1}$ to $F_{e,N}$ are chosen below the Shannon sampling criterion and slightly offset from one another. In other words, if $F_{max}$ is the maximum frequency of the signal or signals to be received, the N sampling frequencies are chosen to be less than $2 \times F_{max}$.

Each processing channel comprises a digital frequency meter 204, 205, the output of which is an ambiguous frequency measurement of the received signal as expressed previously by the equation (1). These digital frequency meters perform discrete Fourier transforms 207, 208, usually designated by the acronym DFT, and are performed continuously with a time overlap, for example, of 50%. A maximum detection is performed on each transform result $DFT_i$, i designating the time index of said transforms. A so-called rough frequency measurement denoted $FG_{k,i}$ is then available. The frequency resolution $R(FG_{k,i})$ of this measurement can be expressed by using the following expression:

$$R(FG_{k,i}) = \frac{F_{e,k}}{N\_pt\_TFD\_k} \quad (2)$$

in which N_pt_TFD_k is the number of points of the discrete Fourier transform for the processing channel number k and $F_{e,k}$ the sampling frequency used for this same channel.

The measurements are sent periodically every τ seconds, τ being able to be expressed by:

$$\tau = \frac{N\_pt\_acq\_k}{2 \times F_{e,k}} \quad (3)$$

in which N_pt_acq_k represents the number of signal acquisition points used on the channel k.

The accuracy of the frequency measurement obtained at this stage is insufficient with respect to the required accuracy.

The aim of the next processing circuit 209, 210 is to test the consistency of the rough frequency $FG_i$ obtained over 2 consecutive transforms, and, if necessary, to calculate the fine frequency. One consistency criterion is, for example, to check whether the deviation between $FG_{k,i}$ and $FG_{k,i-1}$ is greater than a line of the DFT. If such is the case, the channel k is considered to be inconsistent and the measurement of index i of the channel k is invalidated. Otherwise, the channel is considered consistent, the measurement is validated and the value of the measurement is then called fine frequency.

The calculation of the fine frequency relies on the phase difference between two consecutive DFTs. These two DFTs are performed on integration supports offset by a time τ.

The N channels operate in parallel and are synchronized, that is to say that the acquisition sequences have the same duration, that is 2×τ, with an overlap of 50%, and are simultaneous on the N channels. To obtain this synchronization, the value of τ is the same on the N channels. The sampling frequency offsets are compensated by values for the number of acquisition points that are chosen to be slightly different on each channel, or $$\frac{N\_pt\_acq\_k}{2 \times F_{e,k}} = \tau = Cte$$

for any k.

The DFT calculations can be done either on the same number of points as N_pt_acq_k, which requires particular algorithms, or on a greater number of points to achieve the higher $2^n$ by filling with zeros. Thus, it is possible to use the conventional fast Fourier transform (FFT) algorithms.

Given that the N processing channels provide received frequency measurements plus or minus an ambiguity, it is necessary to add a mechanism that makes it possible to obtain a reliable measurement. For this, an ambiguity resolution device 206 can be used. The aim of this device is to deduce from the fine frequency measurements a reliable frequency measurement value.

A consistency indicator 212 for the measurement may be presented at the output of the ambiguity resolution device in parallel with the measured frequency value 211.

In order to detect and classify any phase jumps occurring within a signal pulse, a device 216 can be added to the IFM. This module 216 notably exploits the phase measurements 217 available at the output of the DFTs 207, 208 and associated with each channel. The principle of the estimation of the phase jumps according to the invention is illustrated with the help of FIG. 3.

The functions performed by the N frequency estimation channels 204, 205, by the ambiguity resolution devices 206, by the phase jump detection device 216 and by the pulse detection and characterization device 213 may be located, for example, in at least one FPGA-type programmable circuit.

Figure 3:
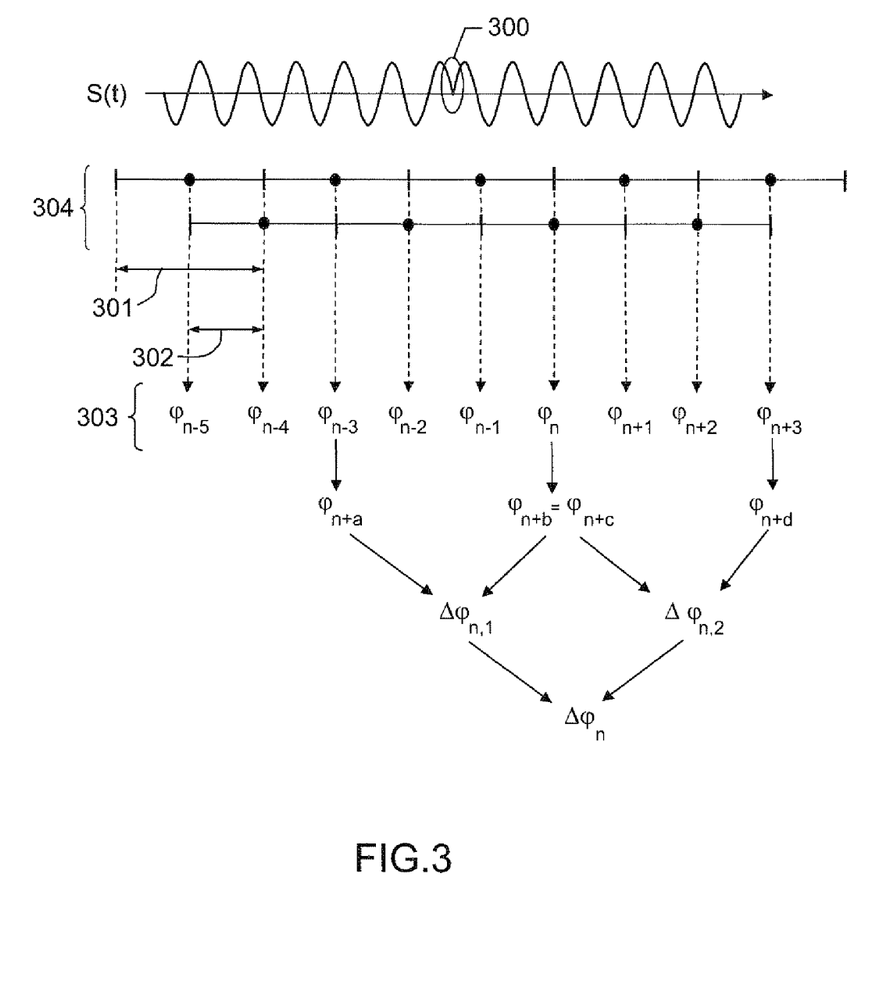
FIG. 3 graphically illustrates the principle of the detection of phase jumps.

FIG. 3 illustrates the principle of the estimation of the phase jumps according to the invention. The phase at the output of the DFTs depends on the time reference of the acquisition sequence. The fine frequency calculated by each channel of the digital IFM can be measured by assuming that the signal was not modulated. In this case, the frequency is deduced from the phase difference $\Delta\phi = 2 \cdot \pi \cdot f \cdot \tau$, with $\tau$ representing the time reference difference between 2 consecutive DFTs.

In the presence of a phase jump, $S\phi$ is situated in the free space between the 2 DFTs, and if the phase deviation $\Delta\phi_n$ is calculated between two phase values obtained by two DFTs that are further apart of index n−i and n, the deviation $\Delta\phi_n$ can be expressed by the expression:

$$\Delta\phi_n = \phi_n - \phi_{n-i} = 2 \cdot \pi \cdot f \cdot i \cdot \tau + S\phi \quad (4)$$

As an example, i can take the value 3 in order to have a free space of $\tau$ between the 2 integration supports when an overlap of 50% has been chosen.

To estimate the value of the phase jump $S\phi$, the term $2 \times \pi \times f \times i \times \tau$ has to be compensated. This can be done by a compensation measurement in a zone that is assumed to be not disturbed by a phase jump, that is to say, either just before or just after said jump. An assumption concerning the minimum duration of such a time zone must be taken so that, during the total measurement duration, that is to say the duration needed for the measurement of the jump and for the compensation measurement, there is only one phase jump at a time.

When a wideband digital receiver such as the one described in FIG. 2 is used, phase measurements are available for each branch at the rate of one measurement $\phi_n$ every $\tau$ seconds. The phase jump estimation principle according to the invention is to use four phase measurements of index n+a, n+b, n+c, n+d for each measurement cycle and to calculate the phase deviation $\Delta\phi_n$ from two intermediate deviations $\Delta\phi_{n,1}$ and $\Delta\phi_{n,2}$ corresponding to two measurement phases by using the following expression:

$$\Delta\phi_n = \Delta\phi_{n,2} - \Delta\phi_{n,1} = (\phi_{n+d} - \phi_{n+c}) - (\phi_{n+b} - \phi_{n+a}) \quad (5)$$

The phase jumps may occur anywhere in the measurement cycles and are offset by $\tau$ in each cycle. They will therefore cover the entire measurement period. This is reflected in 2 measurement spikes of opposite signs. The first spike corresponds to the passage of the phase jump in the 1st measurement phase $\Delta\phi_{n,1}$, or between a and b. The second spike corresponds to the passage of the phase jump in the 2nd measurement phase $\Delta\phi_{n,2}$, that is to say, between c and d.

The example of FIG. 3 illustrates this phase jump estimation principle. A signal S(t) is received at the input of the wideband receiver. Said signal is a sinusoid exhibiting a phase jump of $\tau$ 300. In each digital frequency meter, DFTs are performed continuously over signal acquisition durations offset 302 by a time $\tau$ relative to one another. Each DFT is calculated over a predefined signal acquisition duration 301 and, with regard to the example of the figure, $\tau$ 302 is chosen to be half of this duration (overlap of 50%). For each calculation period 301, a measurement 303 of the phase of the signal is available. There is therefore a measurement available every $\tau$ seconds. The figure represents 9 phase measurements denoted from $\phi_{n-5}$ to $\phi_{n+3}$. These measurements will be used to detect any phase jumps. By using the expression (5) and by taking for this example a=−3, b=c=0 and d=3, $\Delta\phi_{n,1}$ and $\Delta\phi_{n,2}$ are calculated to then deduce an estimation of $\Delta\phi_n$. In the example chosen, $\Delta\phi_n \approx \pi$.

In order not to have to make compensations, the phase shift calculation must be done by using the same filter number for the 4 DFTs of index a, b, c and d. However, in the case of a signal straddling 2 DFT filters and in the presence of noise, the detection of the maximum level may oscillate between 2 adjacent DFT filters. It is therefore advisable to accept a mask of ±m samples on the line indices of the maximum detections, this hereinafter in the description being called "association mask". If the association mask is observed, the phase jump detection is made by using the most recurrent line number. Otherwise, the phase jump detection is invalidated on the channel concerned.

The choice of the parameters a, b, c and d determines the effectiveness of the phase jump detection. A number of orientations can be taken:

b−a=d−c=i to obtain 2 spikes of the same amplitude, with a symmetrical compensation, i representing the duration over which each intermediate deviation $\Delta\phi_{n,i}$ and $\Delta\phi_{n,2}$ is calculated;

b=−c, hence a=−d to obtain a centered measurement;

i sufficiently great, for example i≥3, for the value of the spikes to correspond to the amplitude of the phase jump. If i is less, the measurement does not reach the real amplitude of the phase jump.

The phase error due to noise depends only on the signal-to-noise ratio S/N. Therefore, to favor the detection of the phase jumps in terms of S/N, it is best to choose the configuration of the parameters [a b c d] that supplies the maximum measurement amplitude, that is to say i≥3. Conversely, to favor the detection of the moments of short duration and to limit false alarms given a pulse modulated by a chirp with a fast slope, the supports must be tightened, hence the need to find a compromise.

In the case of a chirp modulation, that is to say, a modulation that is linear in frequency, a permanent phase jump appears on the pulse.

In effect, if $F(t) = p \times (t - t_m)$, p representing the slope of the modulation, the phase $\phi(t)$ is then expressed:

$$\phi(t) = 2\pi \times (\tfrac{1}{2} \cdot p \cdot t^2 + p \cdot t_m \cdot t) \quad (6)$$

$\Delta\phi_n$ is constant and can be expressed by the following expression:

$$\Delta\phi_n = 2\pi \times p \times \tau 2 \times i \times j \quad (7)$$

in which:

i represents the deviation between the two supports of each group and is expressed i=b−a=d−c;

j represents the deviation between the two groups and is expressed j=(c+d)/2−(a+b)/2.

To limit the amplitude of this apparent jump, the two measurement groups must be tightened, by imposing, for example, b=c=0, which implies i=j=d=−a. To favor the processing of the moments of short duration, it is possible to choose (d−a) minimum because the requirement is to have only one phase jump at a time in the measurement period.

Depending on the requirements targeted when implementing the invention, a quadruplet of parameters [a b c d] is determined.

The digital IFM of the receiver has N channels which differ only by their sampling frequency. In phase jump measurement terms, the N channels supply the same information. To improve the operation in terms of S/N ratio, it is appropriate to average the phase jump values obtained on the N channels.

It is important to note that, the phase being defined to within $2\pi$, for a jump of $\pi$, the sign of the jump is indeterminate, in fact $+\pi=-\pi$ modulo $2\pi$.

Depending on the spectral component aliased between 0 and $F_e/2$, the sign may be reversed. The '+' sign will be obtained if $k \cdot F_e < F < (k+0.5)F_e$, then the '−' sign will be obtained if $(k+0.5) \times F_e < F < (k+1) \times F_e$.

The direction of the phase jumps is not usually required. The usual requirement is to classify the phase jump values into categories. As an example, two categories can be defined:

Category 1: jump of $\pm\pi$;
Category 2: jump of $\pm\pi/2$.

Given these comments, it is essential to switch to an absolute value before calculating the average. This causes the estimation values to be brought between 0 and $\pi$.

Because of the sampling and the 1-bit quantization, an unmodulated signal without noise exhibits "spurious" phase jumps. For example, if $f \approx k \cdot F_e/2$, either $FR \approx 0$ or $FR \approx F_e/2$, FR being the aliased frequency and the digital signal exhibits jumps of $\pi$. So as to overcome this phenomenon, if, for one of the N channels, $f \approx k \cdot F_e/2$, the phase jump value for this channel is not taken into account in calculating the average.

Figure 4:
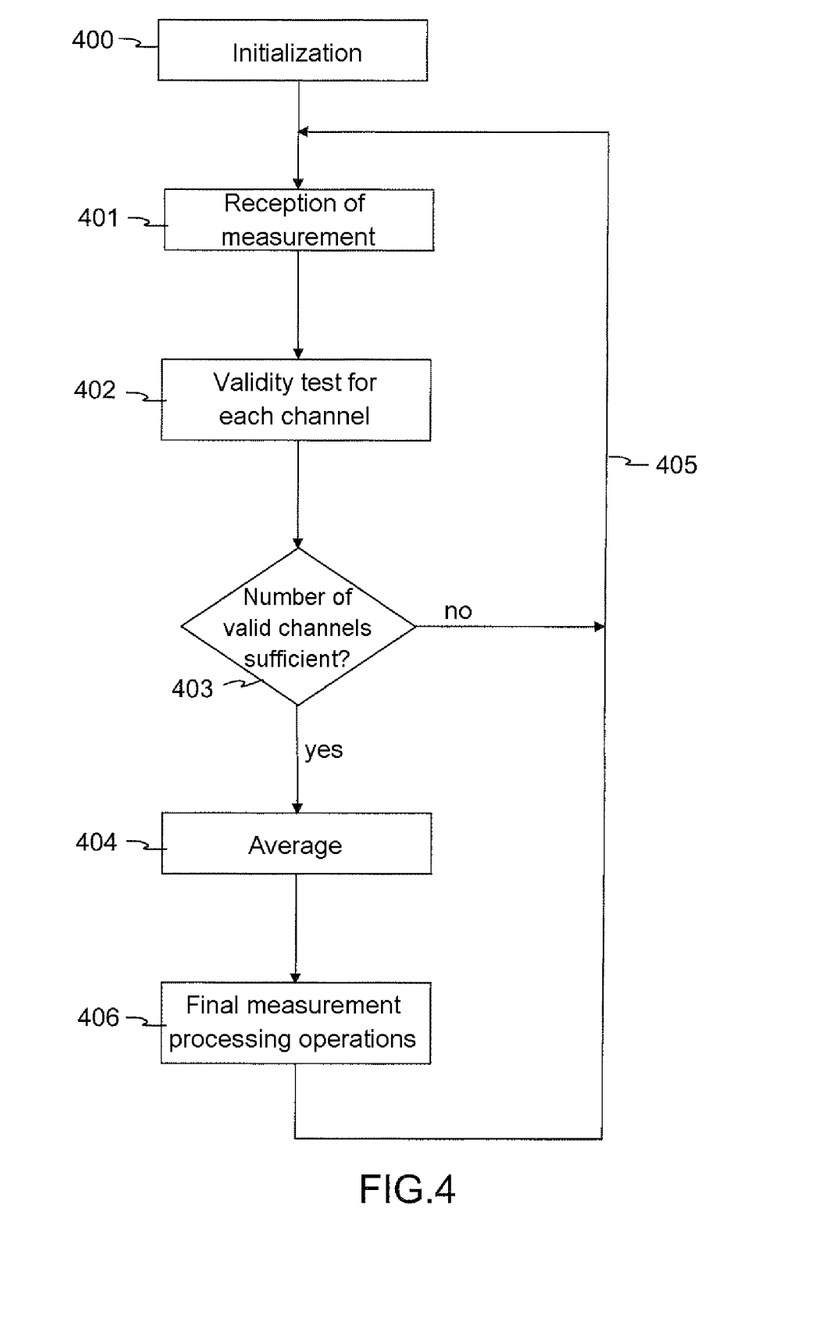
FIG. 4 gives an example of an algorithm that can be used for the implementation of the phase jump detection.

FIG. 4 gives an example of an algorithm that can be used to implement the phase jump detection.

The algorithm is based on the use of the N channels of the wide band receiver. Following an initialization phase 400, the results of the in-phase estimation performed by the N channels are received 401 and the N phase jump values are calculated as described using FIG. 3. Said results are then tested 402 so as to check that they are valid and therefore available for the calculation of the average. As an example, a phase jump measurement on a channel is validated if the association mask is observed and the frequency measurement is distant from the frequency $k \cdot F_e/2$, that is to say that the deviation between the measurement and the frequency $k \cdot F_e/2$ is greater than a predefined threshold.

The final phase jump measurement is considered invalid and is not calculated if, for example, there are not enough phase jump measurements available. For this, the algorithm tests 403 whether this number of measurement is greater than a predefined value $N_{mes}$. This criterion notably makes it possible to significantly reduce the probability of false alarms with very low S/N ratio.

If the validity test is not passed successfully, no final phase jump measurement is calculated and the algorithm waits for the next phase measurements 405.

If the validity test is passed successfully, a final measurement is calculated 404. This final measurement is the average of the absolute values of the phase jumps available.

The final measurements are then processed 406, in order, for example, to associate them with a measurement category. The spikes, that is to say the local maxima, are retained, because the useful "phase jump amplitude" information is situated precisely within the value of these spikes.

Among these spikes, two categories can be distinguished using two thresholds S1 and S2. The spikes are associated with a first category C1, corresponding to phase jumps of $\pi$ by satisfying the condition:

$$\text{spike} > S1 \quad (8)$$

S1 being a predefined threshold value. Similarly, the spikes are associated with a second category C2 corresponding to phase jumps of $\pi/2$ if they satisfy the condition:

$$S1 \geq \text{spike} \geq S2 \quad (9)$$

S2 being a second predefined threshold value. The spikes with a value strictly less than S2 are rejected.

Independently in each category, patterns of two consecutive spikes are sought with the correct deviation, this deviation being dependent on the deviation between the two measurement periods.

If this deviation is observed, a jump is detected. This jump is time-stamped at the intermediate instant between the two spikes and is associated with a jump of $\pi$ or else with a jump of $\pi/2$ depending on the category from which it comes, respectively C1 and C2.

The benefit of this method is that it makes it possible to detect pairs that are very close together, that is to say, moments of short duration. In fact, the deviation between two successive pairs may be less than the deviation between the two spikes of a pair.

Another advantage is the reduction in the rate of false alarms in the presence of pulses modulated with a chirp with a high slope or else with a very low S/N ratio. In fact, it is not enough to cross the threshold, the correct pattern must also be obtained, that is to say, two spikes with the correct deviation.

The invention claimed is:

1. A wideband digital receiver comprising:
   a single antenna configured to receive one or more signals,
   a digital Instantaneous Frequency Measurement (IFM) device configured to measure a frequency of the received one or more signals based on a plurality of results of discrete Fourier transforms (DFTs) applied to said received one or more signals, and
   a module configured to periodically estimate phase jumps of said one or more signals by determining at least two intermediate phase deviations $\Delta\phi_{n,1}$, $\Delta\phi_{n,2}$ and by deducing a phase jump value $\Delta\phi_n$ from a comparison between said intermediate phase deviations and combining measurements of a phase of said one or more signals produced by the DFTs, wherein the digital IFM device comprises N branches arranged in parallel, each branch being configured to measure the frequency and a phase of the received signal or signals after digitization, said digitization being performed with a sampling frequency $(F_{e,1}, \ldots, F_{e,N})$ specific to the each branch, each sampling frequency being less than a double of the radiofrequency bandwidth of the digital IFM and providing acquisition sequences having a same duration in each branch, the phase measurements produced being used to estimate for the each branch a respective phase jump value.

2. The receiver according to claim 1, wherein four phase measurement $(\phi_{n+a}, \phi_{n+b}, \phi_{n+c}, \phi_{n+d})$ corresponding to respective results of four DFTs applied at instants referenced in time by indices n+a, n+b, n+c and n+d are combined in order to detect and estimate the phase jump value $\Delta\phi_n$ associated with a measurement period.

3. The receiver according to claim 2, wherein the phase jump value $\Delta\phi_n$ associated with the measurement period is determined by calculating a difference between an intermediate deviation $\Delta\phi_{n,1}=(\phi_{n+b}-\phi_{n+a})$ and $\Delta\phi_{n,2}=(\phi_{n+d}-\phi_{n+c})$ by using an expression: $\Delta\phi_n=\Delta\phi_{n,2}-\Delta\phi_{n,1}$.

4. The receiver according to claim 2, wherein the indices of the four phase measurements ($\phi_{n+a}$, $\phi_{n+b}$, $\phi_{n+c}$, $\phi_{n+d}$) are chosen such that (b−a)=(d−c).

5. The receiver according to claim 2, wherein the phase jump is detected by an identification of a pattern of two consecutive phase measurement spikes, a spacing of which is linked to a choice of the indices a, b, c and d.

6. The receiver according to claim 2, wherein the indices of the four phase measurements $\phi_{n+a}$, $\phi_{n+b}$, $\phi_{n+c}$ and $\phi_{n+d}$ are chosen such that b=−c and a=−d.

7. The receiver according to claim 1, wherein an average of at least K phase jump estimations is calculated in each measurement period, the K phase jump estimations being obtained on K branches, K being less than or equal to a total number of branches N.

8. The receiver according to claim 1, wherein the phase jump measurements estimated in each measurement period are classified by categories.

9. The receiver according to claim 8, wherein two measurement categories are defined, a first category of measurement being associated with a phase jump of $\pm\pi$ and a second category of measurement with a phase jump of $\pm\pi/2$.

10. The receiver according to claim 1, wherein the signals of interest are radar pulses.

* * * * *